United States Patent [19]

Hatano

[11] Patent Number: 5,508,753
[45] Date of Patent: Apr. 16, 1996

[54] LUMINANCE AND CHROMINANCE SIGNAL SEPARATING APPARATUS

[75] Inventor: Takahisa Hatano, Sapporo, Japan

[73] Assignee: Matsushita Electric Industrial Co., Ltd., Kadoma, Japan

[21] Appl. No.: 413,344

[22] Filed: Mar. 30, 1995

[30] Foreign Application Priority Data

Apr. 21, 1994 [JP] Japan .................................. 6-083095

[51] Int. Cl.⁶ ................................................... H04N 9/78
[52] U.S. Cl. ........................................... 348/665; 348/667
[58] Field of Search ................................... 348/663, 664, 348/665, 666, 667; H04N 9/78

[56] References Cited

U.S. PATENT DOCUMENTS 5,394,193  2/1995  Kim ....................................... 348/667

FOREIGN PATENT DOCUMENTS 0590831  4/1994  European Pat. Off. .
48589  2/1989  Japan ............................... H04N 9/78
71288  3/1989  Japan ............................... H04N 9/78

OTHER PUBLICATIONS

UK Search Report dated Jun. 15, 1995.

Primary Examiner—James J. Groody
Assistant Examiner—Glenton B. Burgess
Attorney, Agent, or Firm—Ratner & Prestia

[57] ABSTRACT

A luminance and chrominance signal separating apparatus includes a first delay device for delaying an input chrominance color television signal by one horizontal period and a second delay device for delaying a reference signal one horizontal period. An output of the first delay device is regarded as a reference signal. Two correlation detectors detect correlations between the reference signal and the signals separated from the reference signal by one horizontal period. A black level detector detects a black level of the reference signal. Filters separate a chrominance signal from the reference signal. A selector selects one of the outputs of the filters based on the output of the correlation detectors and the output of the black level detector. A bandpass filter limits a bandwidth of the selector output and outputting a chrominance signal. A subtracter subtracts the chrominance signal obtained from the bandpass filter from the reference signal and outputs a luminance signal.

3 Claims, 4 Drawing Sheets

LUMINANCE AND CHROMINANCE SIGNAL SEPARATING APPARATUS

BACKGROUND OF THE INVENTION

1. Field of the Invention

The present invention relates to a luminance and chrominance signal separating apparatus for separating a luminance signal and a chrominance signal from a composite color television signal.

2. Description of the Prior Art

According to recent digital signal processing techniques, an adaptive type luminance and chrominance signal separating apparatus selects a filter according to whether a correlation exists between a signal at a reference point and a signal in a horizontal or vertical vicinity of the reference point. This type of apparatus is used for separating a luminance signal and a chrominance signal from a composite color television signal.

A block diagram of a luminance and chrominance signal separating apparatus in accordance with the prior art is shown in FIG. 1.

An input composite color television signal is delayed at a first delay device (line memory) 401 and at a second delay device (line memory) 402 each by 1H period. Here, 1H means one horizontal period. Because each of a first subtracter 404 and a second subtracter 405 have two input signals having a 1H time difference, they perform as a comb filter. An output signal of the first 1H delay device 401 is regarded as a reference signal.

The output signal of the first delay device 401 is directly inputted to a first bandpass filter 403 and a chrominance signal is extracted there.

A correlation between the reference signal and the signals which are separated (ahead and behind) by each 1H period from the reference signal is detected at a first correlation detector 406 and a second correlation detector 407. The absolute value of the difference between two composite color signals (i.e., the reference signal supplied from the first delay device 401 and the signal which is the input composite color signal that is 1H period ahead of the reference signal) is determined. The absolute value is then filtered and the filtered value is compared to a specified value to detect whether a correlation exists or not. These three actions are performed separately at both the first correlation detector 406 and the second correlation detector 407.

The signal ahead of the reference signal by 1H period is located at the point on the upper scanning line adjacent to the point where the reference signal exists. The signal behind the reference signal by 1H period is located at the point on the lower scanning line adjacent to the point where the reference signal exists. The points on the upper and lower adjacent scanning lines can be called vertical vicinities (on the screen) of the point where the reference signal exists.

One of the three outputs (from the two subtracters 404 and 405 and the first bandpass filter 403) is selected at a selector 408 based on the output of the first correlation detector 406 and the second correlation detector 407. For example, when there is a correlation between the reference signal and the signal 1H period ahead of the reference signal, the output of first subtracter (comb filter) 404 is selected. When there is a correlation between the reference signal and the signal 1H period behind the reference signal, the output of the second subtracter (comb filter) 405 is selected. When there is no correlation both between the reference signal and the signal 1H period ahead of the reference signal and between the reference signal and the signal 1H period behind the reference signal, the output of the bandpass filter 403 is selected. An optimum filter can be selected by detecting a correlation. A chrominance signal is obtained at the output of a second bandpass filter 409 by limiting a color frequency bandwidth of the output of the selector 408. A luminance signal can be obtained by subtracting (using subtracter 410) the chrominance signal at the output of the bandpass filter 409 from the time compensated signal which is delayed by 1H period from the input signal.

In the above-mentioned configuration, however, when an incorrect filter is selected due to a misdetection at the correlation detectors, if the reference signal level is a black level, dot interference could be outstanding.

The present invention offers a luminance and chrominance separating apparatus in which dot interference cannot be perceived even if the correlation detectors misdetect a signal.

SUMMARY OF THE INVENTION

To solve the above-mentioned problem, a luminance and chrominance signal separating apparatus in accordance with a first exemplary embodiment of the present invention includes a first delay device for delaying an input composite color television signal by one horizontal period; a second delay device for delaying a signal by one horizontal period from a reference signal, where an output signal of the first delay device is regarded as a reference signal; two correlation detectors for determining the correlations between the reference signal and signals which are ahead of and behind the reference signal by one horizontal period; a black level detector for detecting a black level of the reference signal; two comb filters composed of two subtracters for extracting chrominance signals from the composite color television signal; a first bandpass filter for extracting a chrominance signal from the composite color television signal which is an output of the first delay device; a selector for selecting one of the outputs of the two comb filters and the output of the first bandpass filter, according to the outputs of the two correlation detectors and the black level detector; a second bandpass filter for limiting the bandwidth of the signal from the selector and outputting a chrominance signal; and a subtracter for subtracting the chrominance signal obtained from the second bandpass filter from the composite color television signal outputted from the first delay device, thereby outputting a luminance signal.

A luminance and chrominance signal separating apparatus in accordance with a second exemplary embodiment of the present invention includes the same devices and processing steps as those in the first exemplary embodiment except for the black level detector. Instead, two black level detectors are used here. A signal ahead of the reference signal by one horizontal period (the input composite color television signal) is supplied to one black level detector and a signal behind the reference signal by one horizontal period is supplied to another black level detector. A black level of each supplied signal is detected at each black level detector and outputted to the selector.

A luminance and chrominance signal separating apparatus in accordance with a third exemplary embodiment of the present invention includes the same devices and processing steps as those in the first exemplary embodiment except for the black level detector. The apparatus includes three black level detectors, that is, one is the same as used in an apparatus in accordance with the first exemplary embodiment and the remaining two are the same as used in an apparatus in accordance with the second exemplary embodiment.

According to the present invention, by providing a black level detector, a luminance and chrominance signal separating apparatus can be obtained in which dot interference at a black level is hard to perceive even if the correlation detector makes a signal misdetection.

DETAILED DESCRIPTION OF THE INVENTION (First Exemplary Embodiment)

Figure 1:
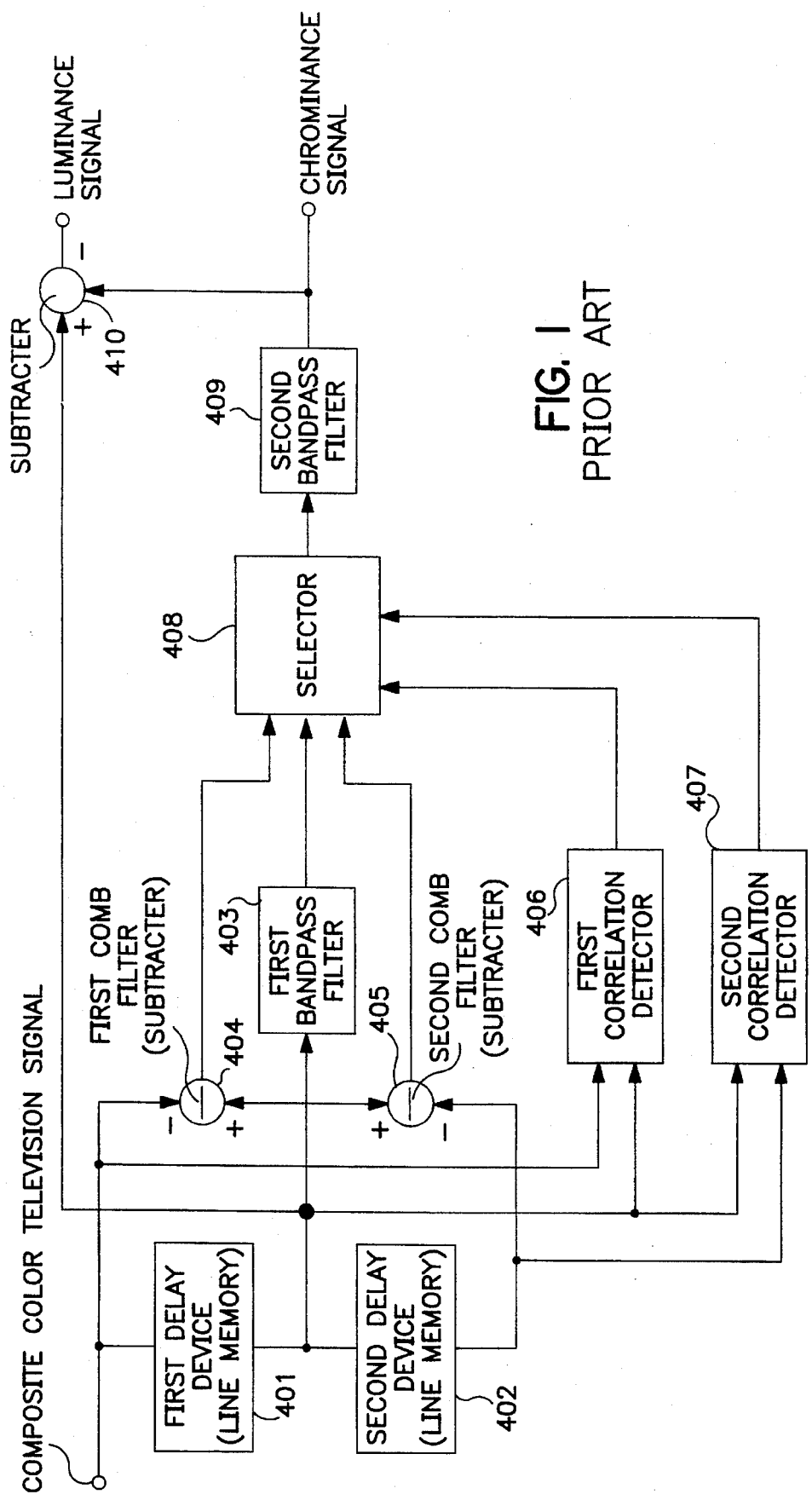
FIG. 1 is a block diagram of a luminance and chrominance signal separating apparatus in accordance with the prior art.
Figure 2:
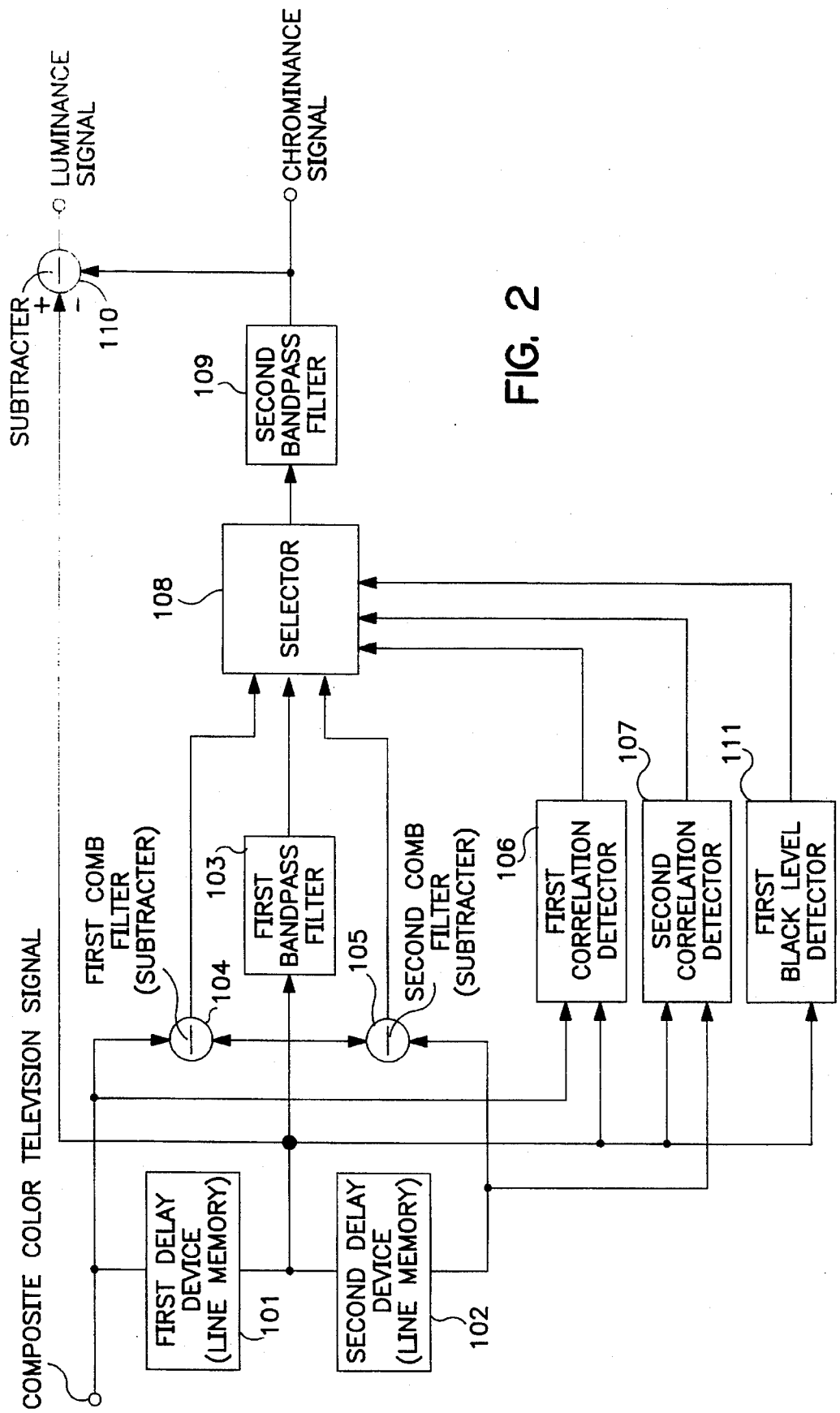
FIG. 2 is a block diagram of a luminance and chrominance signal separating apparatus in accordance with a first exemplary embodiment of the present invention.

A block diagram of a luminance and chrominance signal separating apparatus in accordance with a first exemplary embodiment of the present invention is shown in FIG. 2.

An input composite color television signal is delayed at both a first delay device (line memory) 101 and a second delay device (line memory) 102 by 1H period. The output of the first delay device 101 is regarded as a reference signal. Because two pairs of input signals which are separated from each other by 1H period are inputted to both a first subtracter 104 and a second subtracter 105, the subtracters 104 and 105 act as a comb filter. As a result, chrominance signals are obtained at the outputs of the subtracters 104 and 105. Another chrominance signal is obtained by passing the reference signal through a first bandpass filter 103.

Correlations between the reference signal and the signals separated from the reference signal, each by 1H period (lead and delay), are detected at a first correlation detector 106 and a second correlation detector 107. The absolute value of the difference between two chrominance signals which are separated by 1H period is obtained. The absolute value is then filtered at a low pass filter. The filtered average value is compared with a threshold level to determine a correlation value. A black level of the reference signal is detected at a black level detector 111.

For example, if a signal level lower than the threshold level exists over one subcarrier period, the signal is regarded to have a black level.

One of the three filters 103, 104 and 105 is selected based on the outputs of the first correlation detector 106, the second correlation detector 107 and the black level detector 111. For example, if there is a correlation between the reference signal and the signal which is ahead of the reference signal by 1H period, the first comb filter (subtracter) 104 is selected at the selector 108. If there is a correlation between the reference signal and the signal which is behind the reference signal by 1H period, the second comb filter (subtracter) 105 is selected at the selector 108. If there is no correlation between the reference signal and the signal which is separated from the reference signal by 1H period, the bandpass filter 103 is selected at the selector 108. Although an optimum filter can be selected by detecting a correlation, dot interference appears when the correlation detector makes a misdetection and selects an incorrect filter. That is, when the reference signal is at a black level and the signal on the line forming a comb filter is a chrominance signal, a dot interference having a half level of the chrominance signal on the line forming the comb filter appears on the reference signal.

At this time, because the original signal is a blackish picture, the dot interference is easy to perceive compared to a case in which the picture is not blackish. When the reference signal is at a black level, the output of the first bandpass filter 103 is compulsorily selected by the selector 108. A chrominance signal is obtained by limiting the bandwidth of the output of the selector 108 at a second bandpass filter 109. A luminance signal is obtained by subtracting the chrominance signal outputted from the second bandpass filter 109 from a signal which is delayed by 1H period from the input composite color television signal and time compensated at a subtracter 110.

(Second Exemplary Embodiment)

Figure 3:
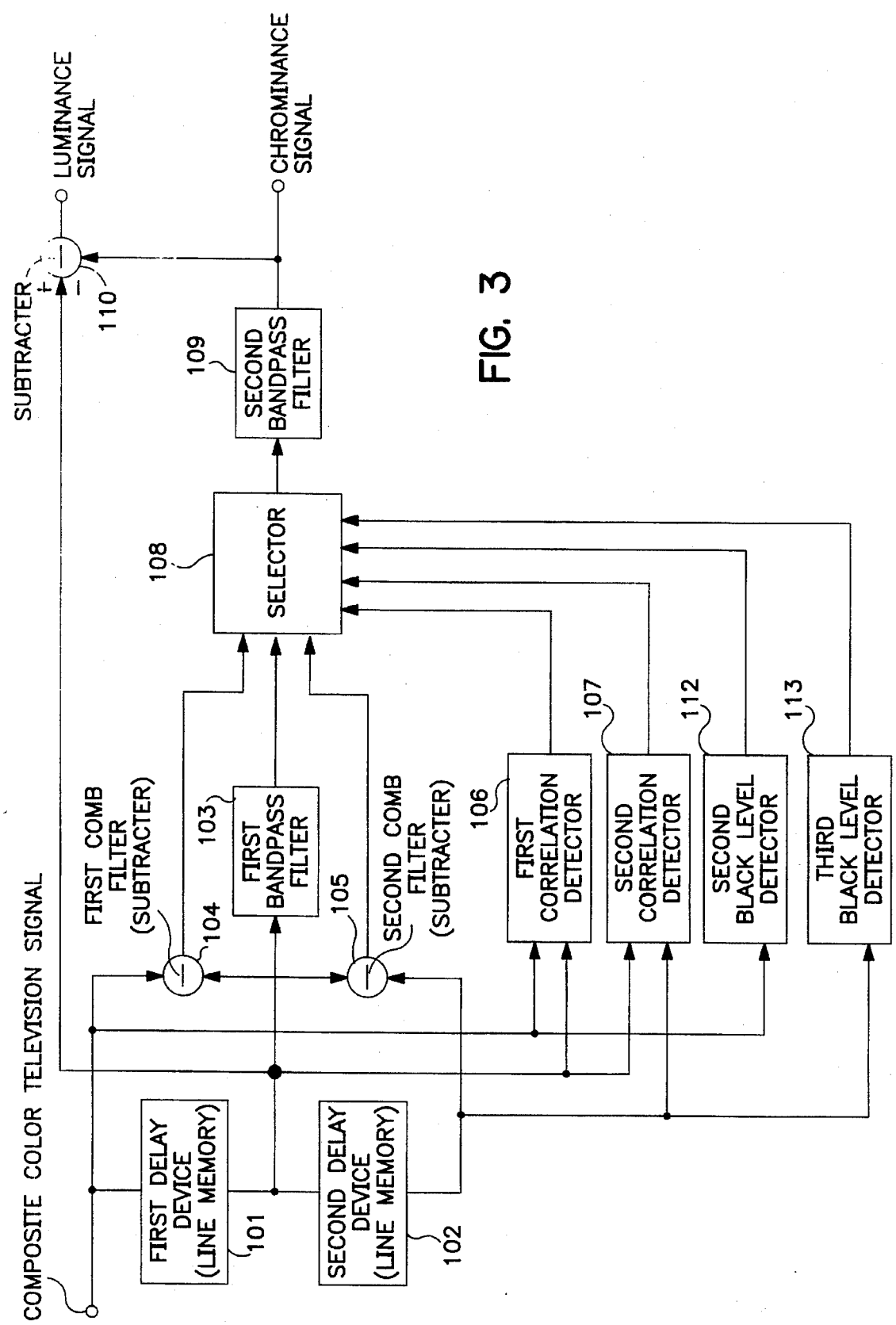
FIG. 3 is a block diagram of a luminance and chrominance signal separating apparatus in accordance with a second exemplary embodiment of the present invention.

A block diagram of a luminance and chrominance signal separating apparatus in accordance with a second exemplary embodiment of the present invention is shown in FIG. 3.

The blocks having similar functions to those in FIG. 2 are numbered with the same reference numbers and the explanation is omitted.

The difference between the second exemplary embodiment and the first exemplary embodiment is the black level detector. In the first exemplary embodiment, the first black level detector 111 detects a black level of the output of the first delay device 101, that is a reference signal, while in the second exemplary embodiment, two black level detectors 112 and 113 are provided instead of the first black level detector 111. One is a second black level detector 112 for detecting a black level of an input signal of the first delay device 101; i.e., a signal ahead of the reference signal by 1H period. The other detector is a third black level detector 113 for detecting a black level of an output signal of the second delay device 102; i.e., a signal behind the reference signal by 1H period.

One of the three filters 103, 104 and 105 is selected based on the outputs of the first correlation detector 106, the second correlation detector 107, the second black level detector 112 and the third black level detector 113.

A similar effect to that of the first exemplary embodiment is obtained, even if the black levels of the signals separated from the reference signal by 1H period are detected.

(Third Exemplary Embodiment)

Figure 4:
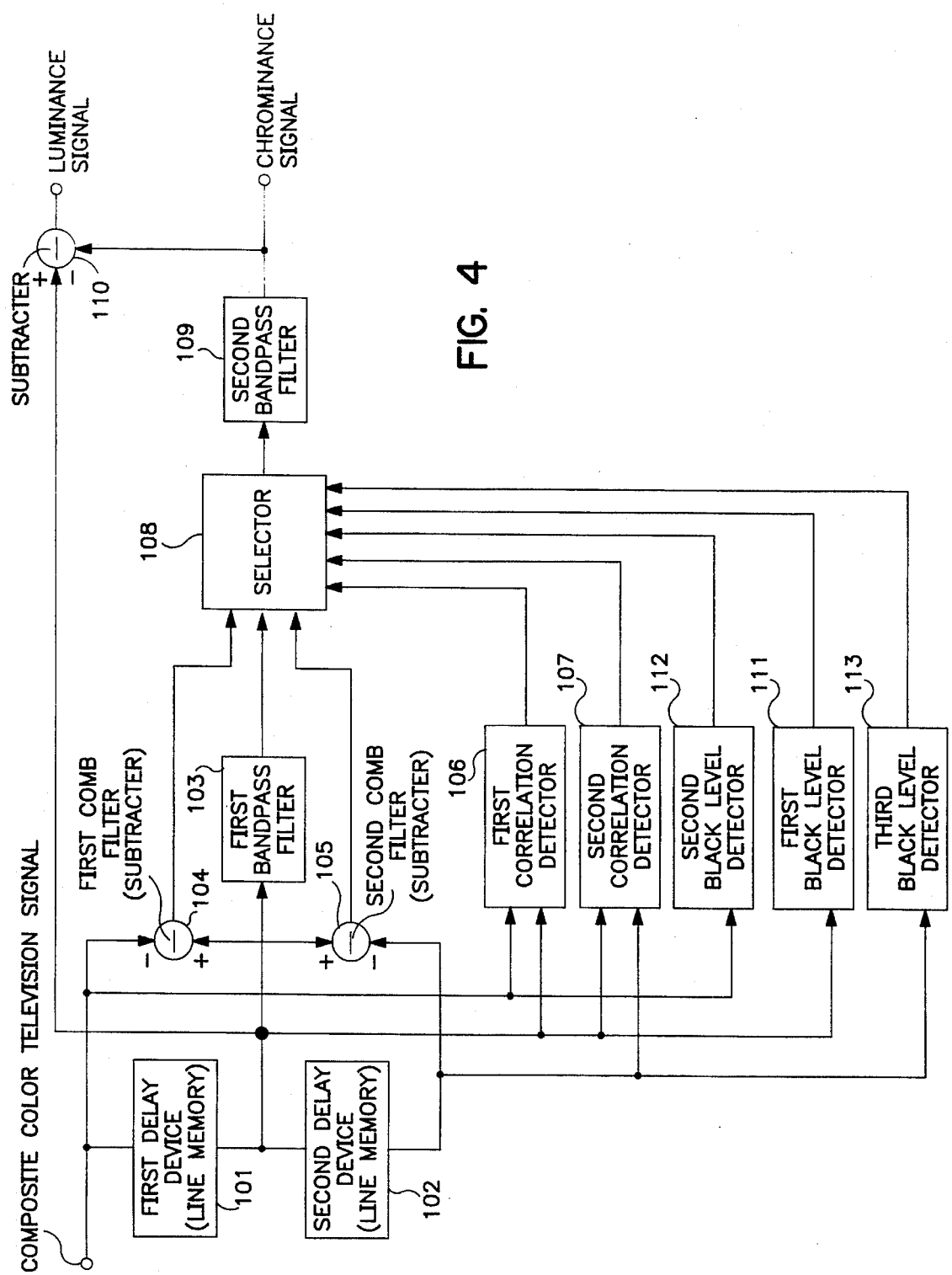
FIG. 4 is a block diagram of a luminance and chrominance signal separating apparatus in accordance with a third exemplary embodiment of the present invention.

A block diagram of a luminance and chrominance signal separating apparatus in accordance with a third exemplary embodiment of the present invention is shown in FIG. 4.

The blocks having similar functions to those in FIG. 2 are numbered with the same reference numbers and the explanation is omitted.

The difference between the third exemplary embodiment and the first and second exemplary embodiments is also the black level detector. In the first exemplary embodiment, the first black level detector 111 detects a black level of the output of the first delay device 101, that is, a reference signal. In the second exemplary embodiment, the second and third black level detectors 112 and 113 detect black levels of signals separated from (ahead of and behind, respectively) the reference signal by 1H period. In the third exemplary embodiment, the first black level detector 111, the second black level detector 112, and the third black level detector 113 are all provided.

One of the three filters 103, 104 and 105 is selected based on the outputs of the first correlation detector 106, the second correlation detector 107, the first black level detector 111, the second black level detector 112 and the third black level detector 113.

A similar effect to that of the first exemplary embodiment is obtained, even if the black levels of the signals separated from the reference signal by 1H period are detected.

A more precise separation of a luminance signal and a chrominance signal can be obtained by detecting black levels of the reference signal and the signals separated by 1H period from the reference signal and by controlling the selector.

As mentioned above, according to the first exemplary embodiment of the present invention, by adding only one black level detector for detecting a black level of a reference signal, a luminance and chrominance signal separating apparatus is realized in which a dot interference at a black level is difficult to perceive, even if the correlation detector makes a misdetection.

According to the second exemplary embodiment of the present invention, by adding two black level detectors for detecting black levels of signals separated from the reference signal by 1H period, a luminance and chrominance signal separating apparatus is realized in which a dot interference at a black level is more difficult to perceive than in the first exemplary embodiment, even if the correlation detector makes a misdetection.

Further, according to the third exemplary embodiment of the present invention, by adding three black level detectors for detecting the black levels of the reference signal and the signals separated from the reference signal by 1H period, a luminance and chrominance signal separating apparatus is realized which suppresses a dot interference at a black level most precisely such that it is even more difficult to perceive, even if the correlation detector makes a misdetection.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A luminance and chrominance signal separating apparatus comprising:

first delay means for delaying an input composite color television signal by at least one horizontal scanning period on a screen;

second delay means for delaying an output signal of said first delay means by at least one horizontal scanning period on the screen;

correlation detector means for detecting a plurality of correlations between a) said output signal and b) each signal of a plurality of signals wherein each signal is offset by at least one horizontal scanning period from a point where said output signal exists;

black level detector means for detecting a black level of said output signal;

first filter means for separating a chrominance signal from the composite color television signal;

selector means for selecting one of a plurality of outputs of said filter means, according to a plurality of outputs of said correlation detector means and an output of said black level detector means;

second filter means for limiting a bandwidth of the selected output of said selector means and producing said chrominance signal; and means for subtracting said chrominance signal from said output signal and producing a luminance signal.

2. A luminance and chrominance signal separating apparatus comprising:

first delay means for delaying an input composite color television signal by at least one horizontal scanning period on a screen;

second delay means for delaying an output signal of said first delay means by at least one horizontal scanning period on the screen;

correlation detector means for detecting a plurality of correlations between a) said output signal and b) each signal of a plurality of signals wherein each signal is offset by at least one horizontal scanning period from a point where said output signal exists;

black level detector means for detecting a plurality of black levels of each signal of said plurality of signals wherein each signal is offset by at least one horizontal scanning period from the point where said output signal exists;

first filter means for separating a chrominance signal from the composite color television signal;

selector means for selecting one of a plurality of outputs of said filter means, according to a plurality of outputs of said correlation detector means and a plurality of outputs of said black level detector means;

second filter means for limiting a bandwidth of the selected output of said selector means and producing said chrominance signal; and means for subtracting said chrominance signal from said output signal and producing a luminance signal.

3. A luminance and chrominance signal separating apparatus comprising:

first delay means for delaying an input composite color television signal by at least one horizontal scanning period on a screen;

second delay means for delaying an output signal of said first delay means by at least one horizontal scanning period on the screen;

correlation detector means for detecting a plurality of correlations between a) said output signal and b) each signal of a plurality of signals wherein each signal is offset by at least one horizontal scanning period from a point where said output signal exists;

black level detector means for detecting a plurality of black levels of said output signal and each signal of said plurality of signals wherein each output signal is offset by at least one horizontal scanning period from the point where said output signal exists;

first filter means for separating a chrominance signal from the composite color television signal;

selector means for selecting one of a plurality of outputs of said filter means, according to a plurality of outputs of said correlation detector means and a plurality of outputs of said black level detector means;

second filter means for limiting a bandwidth of the selected output of said selector means and producing said chrominance signal; and means for subtracting said chrominance signal from said output signal and producing a luminance signal.

* * * * *